3,047,617
ALKANOIC ACID ESTERS OF 5-HYDROXYTETRA-
CYCLINE AND PROCESS FOR PREPARATION
Robert K. Blackwood, Gales Ferry, and Charles R.
Stephens, Jr., Niantic, Conn., assignors to Chas. Pfizer
& Co., Inc., New York, N.Y., a corporation of Delaware
No Drawing. Filed May 18, 1959, Ser. No. 813,652
14 Claims. (Cl. 260—490)

The present invention is concerned with a group of new diesters of 5-hydroxytetracycline, the acid addition and metal salts thereof, the metal salt complexes thereof, the preparation of these diesters, and with novel methods for the transformation thereof into certain known acylated 5-hydroxytetracyclines. The present materials are diacylated products in which the 10 and 12a-hydroxyl groups of 5-hydroxytetracycline are esterified.

The products of the present invention are represented by Formula I. The symbol RCO represents an acyl group wherein R is an alkyl group having 1 to 5 carbon atoms. Typical acyl groups are the acetyl, propionyl, butyryl, valeryl, hexanoyl, isobutyryl, etc. groups.

Formula I

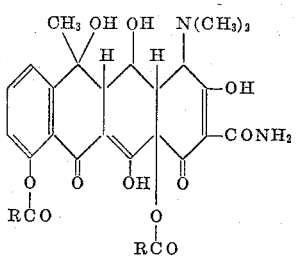

The present materials are useful as intermediates for the preparation of 12a-deoxy-5-hydroxytetracycline by catalytic hydrogenolysis by the method claimed in copending application, Serial Number 813,654, filed May 18, 1959, now U.S. Patent 3,002,021, of Hans H. Rennhard, Lloyd H. Conover, Philip N. Gordon and Charles R. Stephens, Jr. filed herewith.

They are of further use as intermediates in the preparation of the mono- and diacylated 5-hydroxytetracyclines disclosed and claimed in U.S. Patent 2,812,349 of Philip N. Gordon, patented November 4, 1957. The 5-hydroxytetracycline esters of the Gordon patent are therein identified as 12a-monoesters and 5,12a-diesters of oxytetracycline. The same designation will be used herein. It is pointed out by Gordon that 12a-acetyloxytetracycline possesses substantial antimicrobial activity against various microorganisms, and that 5,12a-diacetyloxytetracycline, while having rather low in vitro activity, readily regenerates biologically active oxytetracycline on hydrolysis, and further provides substantial antibiotic activity in the blood stream of an animal on intramuscular administration thereto.

The methods of the present invention for preparing the mono- and diesters of 5-hydroxytetracycline of the patent have very substantial advantages over prior methods. The present process involves either the rearrangement or selective partial hydrolysis of the $O^{10}$, $O^{12a}$-lower dialkanoates of 5-hydroxytetracycline. The present method is very rapid and simple and readily provides the patented mono- and diesters in pure crystalline form. The prior process requires from three days to three weeks for completion, and the resulting products are sometimes difficult to purify. By contrast, the present method for the synthesis of 10,12a-(O,O-diacetyl)-5-hydroxytetracycline requires but one hour, and the rearrangement thereof to the isomeric diacetyloxytetracycline requires a further reaction period of one hour. Selective hydrolysis of 10,12a-(O,O-diacetyl)-5-hydroxytetracycline to 12a-monoacetyloxytetracycline is also a simple process requiring as little as 5 minutes to accomplish. Furthermore, the present method consistently provides the 12a-monoacetate in pure crystalline form.

According to the present invention, the 10,12a-(O,O-diacylated)-5-hydroxytetracyclines are produced by reaction of the amphoteric antibiotic in the presence of from 2 to 8 molecular proportions of pyridine with from about 2 to 8 molecular proportions of the appropriate alkyl carboxylic anhydride. Anhydrides of alkyl carboxylic acids having from 2 to 6 carbon atoms and having the formula $(RCO)_2O$ wherein R has the same meaning given above, may be employed. Examples of operable carboxylic acid anhydrides are acetic anhydride, propionic anhydride, butyric anhydride, and hexanoic anhydride. In a preferred embodiment of the present invention approximately 2 volumes of dimethylformamide per volume of pyridine is added to the reaction mixture. This has the effect of increasing the reaction rate and results in a product of greater purity thus facilitating the isolation and purification steps.

The rearrangement of the 10,12a-lower dialkanoates of 5-hydroxytetracycline to the isomeric diesters of the Gordon patent is carried out by treatment of the novel 10,12a-diester with an aqueous solution containing at least about an equimolar proportion of an alkali metal hydroxide (based on the 10,12a-diester charged), and about a ½ molar proportion of a water soluble magnesium salt. Of course, the anion of the magnesium salt must not react with or cause the decomposition of the antibiotic. Strongly oxidizing or reducing anions such as permanganate are to be avoided. Suitable magnesium salts include chloride, sulfate, nitrate, acetate, formate, bromide, chlorate, and iodide, but particular success has been achieved employing magnesium chloride hexahydrate. Other suitable magnesium salts include the propionate, butyrate, citrate, salicylate, sulfocarbolate, benzoate, lactate, dithionate, ferricyanide, ferrocyanide, cyanide, nitrite, perchlorate, hydrosulfide, thiocyanate, thiosulfate, fluoride, hydroxide, bromate, iodate, sulfate, tartrate, carbonate, as well as various water soluble double salts e.g. magnesium ammonium chloride and magnesium ammonium sulfate. Similarly, the alkali metal hydroxides are operable including potassium, lithium, and sodium hydroxide, but sodium hydroxide is preferred.

Selective hydrolysis of the novel 10,12a-(O,O-diacyl)-5-hydroxytetracyclines to the known 12a-monoesters of oxytetracycline is accomplished by treatment thereof with at least about one molar equivalent of aqueous ammonia. Aqueous ammonia having a concentration of 28% (ordinary commercial grade of aqueous ammonia) is ordinarily employed. The hydrolysis is carried out at room temperature, that is, from about 15 to 40° C., and requires as little as five minutes to come to completion, when 28% aqueous ammonia is employed.

A reaction period just sufficient to effect hydrolysis of the 10-O-acyl group is employed. This is determined by periodically measuring the ultra-violet absorption of acidified aliquots of the reaction mixture and observing the appearance of the characteristic absorption band of the 12a-monoester at about 360 m$\mu$. The ultra-violet absorption curve of the starting diester contains a maximum at about 340 m$\mu$ which disappears in the course of the hydrolysis. When employing 28% aqueous ammonia for the hydrolysis, reaction periods in excess of about one hour result in degradation of the antibiotic to a so-called apo-oxytetracycline type of product and in hydrolysis of the 12a-ester function. This, of course, is undesirable.

According to a further embodiment of the invention, alcoholic magnesium chloride is added to the hydrolysis mixture. This method has the advantage of preventing degradation of the antibiotic ester to an apo-oxytetracycline derivative. It has the disadvantage, however, that the crude product obtained is a magnesium salt complex of the oxytetracycline 12a-monoester from which the free ester is covered by an additional step involving acidic hydrolysis and solvent extraction.

The acid addition and metal salts are prepared by treatment of the 10,12a-(O,O-diacyl)-5-hydroxytetracyclines in an inert solvent with one equivalent of a suitable acid or base. The metal salt complexes are prepared in a similar fashion. The latter are most suitably recovered by evaporation of the solvent. Such procedure is also applicable to recovery of the acid addition and metal salts, but a somewhat simpler method is to add a miscible non-solvent for the salt or complex to effect precipitation thereof. The metal salts such as the sodium, potassium, and lithium salts are, of course, useful starting materials for the rearrangement process described herein. The magnesium and magnesium salt complexes are sometimes intermediates in the partial selective hydrolysis described herein. These and other salts, including the acid addition salts are frequently readily crystallized and thus are useful forms in which to isolate the 10,12a-lower dialkanoates of 5-hydroxytetracycline.

While the present 10,12a-(O,O-lower dialkanoyl)-5-hydroxytetracyclines have little in vitro antimicrobial activity, certain in vivo uses for them exist in the control of infections in animals and as growth stimulants.

absorption maxima (KBr pellet) 5.68, 6.10, 6.25, 6.59, 6.78, 6.88μ.

*Analysis.*—Calcd. for $C_{26}H_{28}O_{11}N_2$: C, 57.35; H, 5.18; N, 5.15; acetyl, 15.8%. Found, C, 57.5; H, 5.4; N, 5.0; acetyl, 17.1%.

In the analytical procedure employed for the acetyl determination, unacetylated, pure 5-hydroxytetracycline analyzes 0.5 to 1% acetyl. This so-called blank value must be subtracted from the analytic results on acetylated products. The corrected acetyl value for the product then corresponds to 16.1 to 16.6%. 10,12a-(O,O-diacetyl)-5-hydroxytetracycline exhibits an R$f$ value of 0.13 to 0.21 in papergrams developed with the solvent system 20:3 toluene:pyridine saturated with pH 4.2 buffer (GB), and R$f$ 0.87 when the solvent system ethylacetate saturated with water (RL) is used.

B. When process A is repeated omitting the dimethylformamide and employing 250 ml. of pyridine and 190 ml. of acetic anhydride, the 10,12a-diacetate is recovered as a somewhat less pure product which provides a lower yield of pure crystalline material on further processing.

EXAMPLE II

*Rearrangement of 10,12a-(O,O-Diacetyl) 5-Hydroxytetracycline*

10,12a - (O,O) - diacetyl-5-hydroxytetracycline of Example I, 14.4 g., is mixed with 75 ml. of water and treat-

TABLE I

*Comparative Properties of Pure Crystalline O-Acetates Of 5-Hydroxytetracycline*

| | 10,12a-Diacetates | Isomeric Diacetate of U.S. 2,812,349 | 12a-Monoacetate |
|---|---|---|---|
| ultra-violet absorption [1] | max. 263, 338 mμ<br>min. 226, 293 mμ | max. 264, 312, 361 mμ<br>min. 231, 292 mμ | max. 267, 361 mμ.<br>min. 232, 294 mμ. |
| infrared [2] | 5.68, 6.10, 6.25, 6.59, 6.78 and 6.88μ | 5.69, 5.84, 6.01, 6.18, 6.33, 6.45, and 6.91μ. | 5.71, 6.20, 6.32, 6.90μ. |
| R$f$ values:[3] | | | |
| GB | 0.13 to 0.21 | solvent front | 0.35 to 0.49. |
| RL | 0.87 | solvent front | 0.90. |

[1] Measured in 0.01 N HCl.
[2] Measured on a pelletized 1% trituration in KBr.
[3] Papergrams prepared employing the following solvent systems: GB-20:3 toluene: pyridine saturated with pH 4.2 buffer, RL-ethyl acetate saturated with water.

The following examples are provided only to serve as illustrations of the manner in which the present invention is to be practiced, and are not to be construed as limiting the scope thereof in any way.

EXAMPLE I

*10,12a-(O,O-Diacetyl)-5-Hydroxytetracycline*

A. Anhydrous 5-hydroxytetracycline (amphoteric), 107 g., is dissolved in 107 ml. of dimethylformamide at room temperature and 80 ml. of acetic anhydride is added all at once. The solution is slowly stirred as 53.3 ml. of pyridine is added during a 10 minute period. Warming occurs during the pyridine addition and external cooling is employed to keep the temperature below 40° C. The mixture is then allowed to cool to 30° C. and stirred at room temperature for one hour. The dimethylformamide reaction solution is then treated with 133 ml. of water resulting in the precipitation of the crude 10,12a-diacetate which is collected on a filter. The moist product is superficially dried by drawing on the vacuum filter overnight, and then crystallized from 650 ml. of warm methanol, yield, 50.0 g.; bioassay *K. pneumoniae* 6.3 mcg./mg. This value indicates that the product contains less than 1% of unreacted 5-hydroxytetracycline.

A portion of the methanol purified material is further purified by dissolving it in methyl isobutyl ketone and reprecipitating it as an amorphous solid by adding hexane; ultra-violet absorption max. (0.01 N HCl), 263 mμ, 338 mμ; minima 226 mμ, and 293 mμ. Principal infrared ed with 7.5 ml of 1 M aqueous $MgCl_2 \cdot 6H_2O$ and 28.8 ml. of 1 M aqueous sodium hydroxide. A clear solution results which is allowed to stir at room temperature for 1 hour. Fifteen minutes after the sodium hydroxide addition has been completed, the reaction mixture has a pH value of 10.9. After the stirring period, the reaction mixture is adjusted to pH 1.5 with 3.4 ml. concentrated hydrochloric acid. Precipitation of a solid material occurs during acidification, but the precipitate dissolves as the acidity approaches pH 1.5. The solution is then extracted for 45 minutes with each of three 150 ml. of portions of chloroform. The chloroform extract is then dried over sodium sulfate and evaporated to dryness in the air. The yellow orange residue is triturated with a small proportion of butanol and transferred to the filter funnel and washed with fresh butanol which removes the red color from the cake. The cake is then drawn on the vacuum filter to remove excess wash liquor. The crude product weighs 5 g. A 1 g. portion of this material is dissolved in 30 ml. of warm acetone containing 1 ml. of butanol and the insoluble material filtered. Crystallization of the product is induced by evaporation of the filtrate and scratching of the inside surface of the container. The resulting 5,12a-(O,O-diacetyl)-5-hydroxytetracycline is dried at 100° C. in vacuo overnight; ultra-violet absorption maxima (0.01 N HCl) 264, 312, 361 mμ, minima 231, and 293 mμ with a minimum plateau at 320 to 341 mμ; infrared absorption maxima (KBr pellet) occur at 5.69, 5.84, 6.01, 6.18, 6.33, 6.45, and 6.91μ; (CHCl₃ solution) 5.71, 6.04, 6.17, 6.31, 6.40, 6.88.

*Analysis.*—Calcd. for $C_{26}H_{28}O_{11}N_2$: C, 57.35; H, 5.18; N, 5.15; acetyl, 15.81. Found: C, 57.48; H, 5.35; N, 5.19; acetyl 15.12.

EXAMPLE III

*Partial Hydrolysis of 10,12a-(O,O-Diacetyl)-5-Hydroxytetracycline*

A. 10,12a-(O,O-diacetyl)-5-hydroxytetracycline of Example I, 22.5 g. is dissolved in a solution of 300 ml. of methanol containing 4.5 g. of magnesium chloride hexahydrate and 18 ml. of 28% aqueous ammonia. The mixture is kept at room temperature for 5 hours and then evaporated to dryness to provide a magnesium chloride complex of 12a-(O-acetyl)-5-hydroxytetracycline. The magnesium chloride complex is then mixed with 500 ml. of water at pH 2 to 3. The aqueous solution is extracted with ethyl acetate, the extracts are dried over sodium sulfate, and evaporated to dryness to provide 16.3 g. of crude 12a-(O-acetyl)-5-hydroxytetracycline contaminated with small amounts of 10,12a-(O,O-diacetyl)-5-hydroxytetracycline. The crude product is recrystallized from chloroform to provide 10 g. of pure 12a-(O-acetyl)-5-hydroxytetracycline. This material is dried in vacuo over paraffin wax and analyzed, *K. pneumoniae* bioassay, 48–58 mcg./mg. corresponding to approximately 1% oxytetracycline. Pure crystalline 12a-(O-acetyl)-5-hydroxytetracycline exhibits the R$f$ values, ultra-violet, and infrared absorption values arranged in Table I.

*Analysis.*—Calcd. for $C_{24}H_{26}O_{10}N_2$: C, 57.37; H, 5.22; N, 5.58; acetyl, 8.56. Found: C, 57.54; H, 5.37; N, 6.06; acetyl, 9.15.

B. 10,12a-(O,O-diacetyl)-5-hydroxytetracycline, 1 g., is mixed with 25 ml. of water and sufficient 28% aqueous ammonia added to adjust the pH to 10.5. After stirring for 5 minutes, the diester dissolves. When this has occurred, the solution is acidified to pH 3.5 with aqueous hydrochloric acid, and the resulting 12a-monoacetate is recovered by extraction with ethyl acetate. The extracts are dried, the solvent distilled and the product recrystallized from chloroform as above. 12a-(O-acetyl)-5-hydroxytetracycline identical with that obtained in part A of this example is obtained.

C. As an alternative to adjusting to pH 10.5 in process B above, an equimolar amount, approximately three drops, of 28% aqueous is used with substantially the same results.

EXAMPLE IV

*10,12a-(O,O-Dipropionyl)-5-Hydroxytetracycline*

The process of Example IA is repeated employing propionic anhydride rather than acetic anhydride. 10,12a-(O,O-dipropionyl)-5-hydroxytetracycline is recovered in a similar fashion.

*Analysis.*—Calcd. for $C_{28}H_{32}O_{11}N_2$: C, 58.72; H, 5.63; N, 4.89. Found: C, 58.3; H, 5.77; N, 4.68.

Ultra-violet absorption maxima occur at 263mμ and 341 mμ and minima at 226 mμ and 293 mμ.

Characteristic infrared absorption maxima occur at the following wave lengths: 2.96μ, 5.67μ, 6.08μ, 6.23μ, 6.57μ and 6.85μ.

EXAMPLE V

*10,12a-(O,O-Divaleryl)-5-Hydroxytetracycline*

The procedure of Example IA employing the anhydride of valeric acid in place of acetic anhydride. The product is recovered in a similar fashion.

*Analysis.*—Calcd. for $C_{32}H_{40}O_{11}N_2$: C, 61.10; H, 6.41; N, 4.46. Found: C, 60.74; H, 6.39; N, 4.40.

EXAMPLE VI

*Acid Addition Salts*

A. One gram of 10,12a-(O,O-diacetyl)-5-hydroxytetracycline is dissolved in the minimum quantity of dimethylformamide and one molecular proportion of concentrated hydrochloric acid is added with stirring. The hydrochloride salt is then precipitated by adding several volumes of ether to the dimethylformamide solution with stirring. It is collected, washed, and dried.

B. An analogous procedure is used to prepare the hydrobromide, hydroiodide, sulfate, nitrate, phosphate, p-toluene, sulfonate, methane sulfonate, and citrate salts.

EXAMPLE VII

*Metal Salts*

A. One gram of 10,12a-(O,O-diacetyl)-5-hydroxytetracycline is dissolved in the minimum quantity of dimethylformamide and one molecular proportion of sodium hydroxide dissolved in the same solvent is added with stirring. The sodium salt is then precipitated by adding several volumes of ether to the dimethylformamide solution with stirring. It is collected, washed and dried.

B. By substituting the appropriate oxide or hydroxide the potassium, lithium, calcium, barium, magnesium, zinc, aluminum, and ferric salts are prepared.

C. The metal salt complex such as the magnesium chloride, calcium chloride, or zinc chloride complexes are prepared by the same procedure, but employing the metal salt in place of the metal hydroxide or metal oxide.

What is claimed is:

1. A compound selected from the group consisting of 10,12a-(O,O-diacyl)-5-hydroxytetracycline, the acid addition salts, the metal salts, and the metal salt complexes thereof, each of said acyl groups being of the formula RCO— wherein R is an alkyl group having from 1 to 5 carbon atoms.

2. 10,12a-(O,O-diacetyl)-5-hydroxytetracycline.

3. 10,12a-(O,O-dipropionyl)-5-hydroxytetracycline.

4. 10,12a-(O,O-divaleryl)-5-hydroxytetracycline.

5. A process for the preparation of 10,12a-(O,O-diacyl)-5-hydroxytetracycline which comprises treating a mixture of one molecular proportion of amphoteric 5-hydroxytetracycline and from about 2 to 8 molecular proportions of pyridine with from about 2 to 8 molecular proportions of an alkyl carboxylic acid anhydride having the formula (RCO)₂O wherein R is an alkyl group having from 1 to 5 carbon atoms at a temperature of from about 15 to 40° C.

6. The process of claim 5 wherein approximately two volumes of dimethylformamide per volume of pyridine is added to the reaction mixture.

7. The process of claim 5 wherein said alkyl carboxylic acid anhydride is acetic anhydride.

8. The process which comprises treating 10,12a-(O,O-diacyl)-5-hydroxytetracycline with an aqueous solution containing an approximately equimolecular proportion of an alkali metal hydroxide and approximately a ½ molar proportion of a water soluble magnesium salt at a temperature of about 15 to 40° C. and recovering resulting 5,12a-diester of 5-hydroxytetracycline, said acyl groups being of the formula RCO— wherein R in an alkyl group having 1 to 5 carbon atoms.

9. The process of claim 8 wherein said 10,12a-(O,O-diacyl)-5-hydroxytetracycline is 10,12a-(O,O-diacetyl)-5-hydroxytetracycline.

10. The process which comprises treating 10,12a-(O,O-diacyl)-5-hydroxytetracycline with at least a molar equivalent of aqueous ammonia at a temperature of from about 15 to 40° C. for a period of time just sufficient to selectively hydrolyze said 10-O-acyl group, said O-acyl groups being of the formula RCO— wherein R in an alkyl group having from 1 to 5 carbon atoms.

11. The process of claim 10, wherein said 10,12a-(O,O-diacyl)-5-hydroxytetracycline is 10,12a-(O,O-diacetyl)-5-hydroxytetracycline.

12. The process of claim 5 wherein said alkyl carboxylic acid anhydride is propionic anhydride.

13. The process of claim 5 wherein said alkyl carboxylic acid anhydride is valeric anhydride.

14. The process of claim 10 wherein said 10,12a-(O,O-diacyl)-5-hydroxytetracyline is 10,12a-(O,O-dipropionyl)-5-hydroxytetracycline.

References Cited in the file of this patent

UNITED STATES PATENTS

| | | |
|---|---|---|
| 2,671,806 | Winterbottom et al. | Mar. 9, 1954 |
| 2,812,349 | Gordon | Nov. 5, 1957 |

FOREIGN PATENTS

| | | |
|---|---|---|
| 516,567 | Canada | Sept. 13, 1955 |

OTHER REFERENCES

Smith et al.: Journal Society of Chemistry (London), vol. 95, pages 1060–64 (1909).

Amagasa et al.: Chemical Abstracts, vol. 35, page 3841 (1941).

Amagasa et al.: Chemical Abstracts, vol. 35, page 3978 (1941).

Malm et al.: Journal American Chemical Society, vol. 75, pages 80–84 (1953).

Boothe: Antibiotics Annual (1953–4), page 47.